United States Patent [11] 3,623,024

[72] Inventor Dale Leslie Hamilton
Silver Spring, Md.
[21] Appl. No. 704,456
[22] Filed Feb. 9, 1968
[45] Patented Nov. 23, 1971
[73] Assignee The United States of America as represented by the Secretary of the Army

[54] SIGNAL RECOVERY SYSTEM USING OPTICAL MIXING
24 Claims, 8 Drawing Figs.

[52] U.S. Cl. .......... 340/173 LM, 250/219 R, 350/160 R, 350/315
[51] Int. Cl. .......... G11c 13/04
[50] Field of Search .......... 250/219 R; 340/173 LM; 350/162

[56] References Cited
UNITED STATES PATENTS

| | | | |
|---|---|---|---|
| 3,438,050 | 4/1969 | Aschenbrenner | 346/49 |
| 3,448,458 | 6/1969 | Carlson | 340/173 |
| 3,460,099 | 8/1969 | Fredkin | 340/173 |

*Primary Examiner*—Terrell W. Fears
*Attorney*—John R. Utermohle

ABSTRACT: An apparatus for detecting information from a light-responsive storage medium whereby plain parallel monochromatic light is passed through the medium to obtain resultant optical waves which are combined with a reference wave by optical mixing to obtain the desired information output.

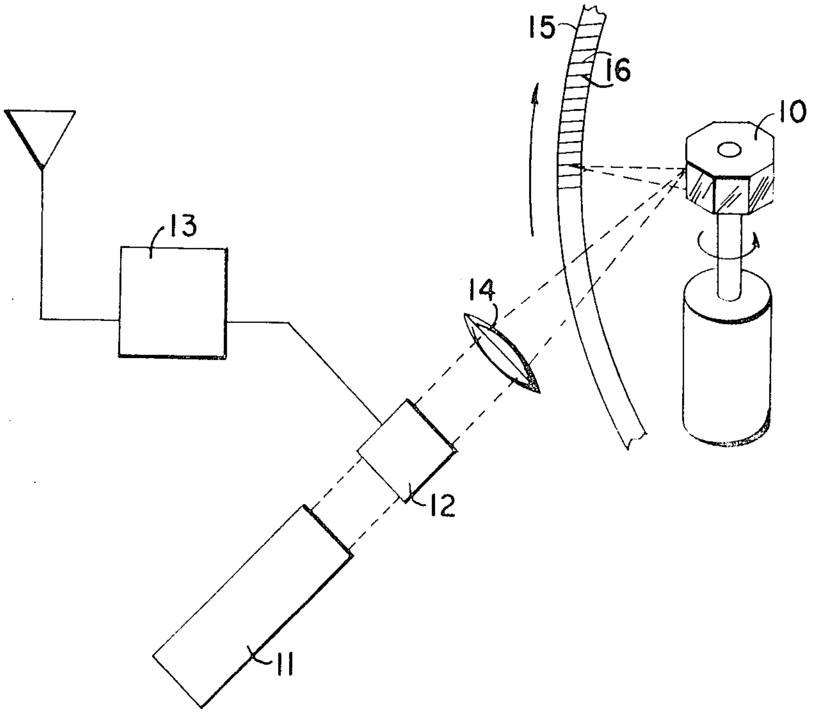
PRIOR ART
FIG I
INVENTOR
Dale L. Hamilton
BY
ATTORNEY

INVENTOR
Dale L. Hamilton

BY

ATTORNEY

INVENTOR

Dale L. Hamilton

BY

ATTORNEY

INVENTOR
Dale L. Hamilton

BY

ATTORNEY

SIGNAL RECOVERY SYSTEM USING OPTICAL MIXING

BRIEF SUMMARY

This invention relates to coherent optical processing systems, and more particularly to signal recovery systems utilizing optical mixing means to attain the desired signal information output.

Information storage can be accomplished by intensity modulating a focused laser beam with wide-band predetection RF transversely across a longitudinally transported photographic film. This type of recording system produces a series of closely spaced transverse tracks in the photographic emulsion. These tracks are density modulated in accordance with the wide-band information on the laser beam. Information storage systems of this general nature have been proposed and constructed during the past few years.

The primary difficulty with such systems is that of information retrieval. It is extremely difficult to build a mechanical servo mechanism system that will perform a function of individual line scanning on a readout. To date, no successful laser beam, line-scanning mechanism exists. Therefore, the coherent optical processing system according to the present invention provides the facilities, both optical and electrical, for optically processing signals in a manner analogous to a conventional receiver, so as to retrieve the information without line scanning.

An object of this invention is to provide simple and efficient coherent, optical-processing means for recovering by optical mixing information stored on a light-responsive storage medium which has been illuminated.

Another object of this invention is retrieval of information without line scanning.

Still another object of this invention is to optically process any type of desired signals in a manner analogous to a conventional receiver.

A still further object of this invention is to provide a simple and efficient coherent optical processing means which can locate frequencies and separate them from the display with a very high degree of precision.

Other objects and many of the intended advantages of this invention will be readily appreciated as the invention becomes better understood by reference to the following description when taken in conjunction with the following drawings wherein:

FIG. 1 is a side view of prior art apparatus illustrative of a technique for recording information with a laser beam;

Figure 2A:
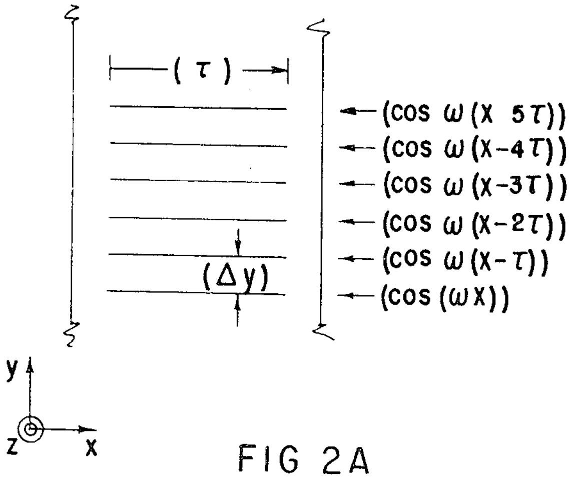
FIG. 2A is a graphic illustration of a pattern which is recorded on photographic film.
Figure 5:
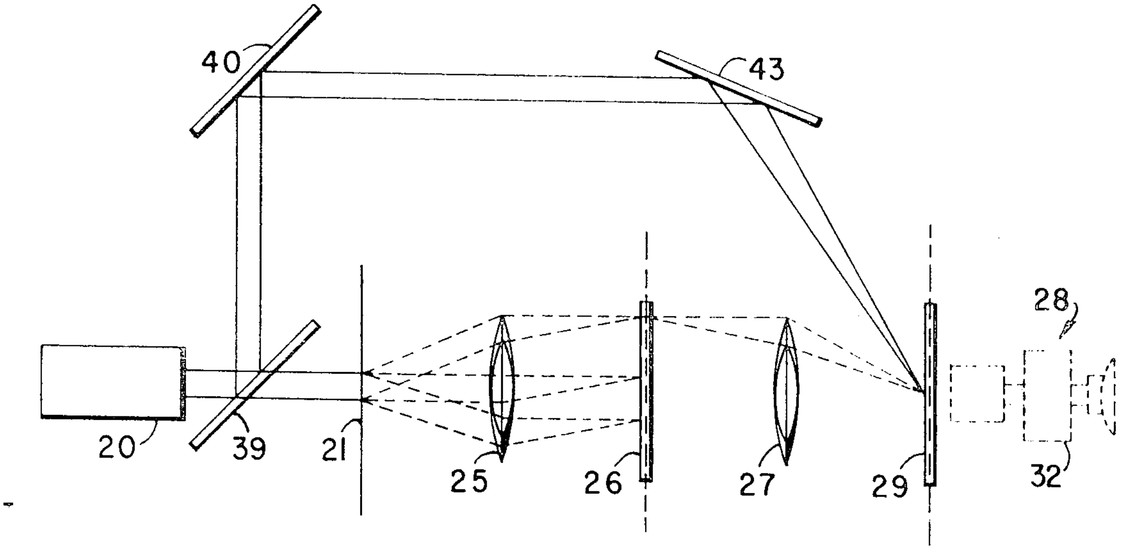
FIG. 5 is a side view of another embodiment of the present invention which applies the same optical mixing concept.

Referring to FIG. 1, wherein a general picture can be seen of an optical processing system utilizing a mechanically rotating mirror 10 for sweeping a modulated laser beam, derived by passing the laser 11 output through a wide-band optical modulator 12, which is connected to a wide-band amplifier 13, and then through a lens 14, onto a rotating mirror 10 which sweeps the modulated laser beam, line by line, across a moving film 15 to record information tracks 16 in a raster fashion. This recorded information is what the present invention, the preferred embodiment being shown in FIG. 3, seeks to detect while eliminating the necessity for tracking and utilizing a negligible amount of mechanically moving parts. FIG. 5 shows another embodiment of the present invention which applies the same optical mixing techniques utilized in the present invention shown in FIG. 3, for detecting information signals stored in the raster fashion of FIG. 1 and illustrated in more detail in FIG. 2A.

An article by L. J. Cutrona et al., entitled "Optical Data Processing and Filtering Systems," which appeared in the "I.R.E. Transactions on Information Theory," June 1960 (pages 386–400) describes the broad concept of putting A.M. signals through two Fourier transforms to detect information after a demodulation occurs at the second Fourier transform. Another article, entitled "Optical Spectrum Analysis of Large Bandwidth Signals," by Carlton E. Thomas, which appeared in "Applied Optics," Vol. 5, No. 11, Nov., 1966 (pages 1782–1790) described a one-lens apparatus which utilizes one Fourier transform for detection of a power spectrum of "on-off" information signals. These articles stored information by optical techniques. Neither article employed the unique concepts of optical mixing and utilization of beam-splitting apparatus to provide the signals to be optically mixed so as to be able to detect a multitude of stored information types in a universal optical receiver, such as that of the present invention, shown in FIG. 3.

Figure 3:
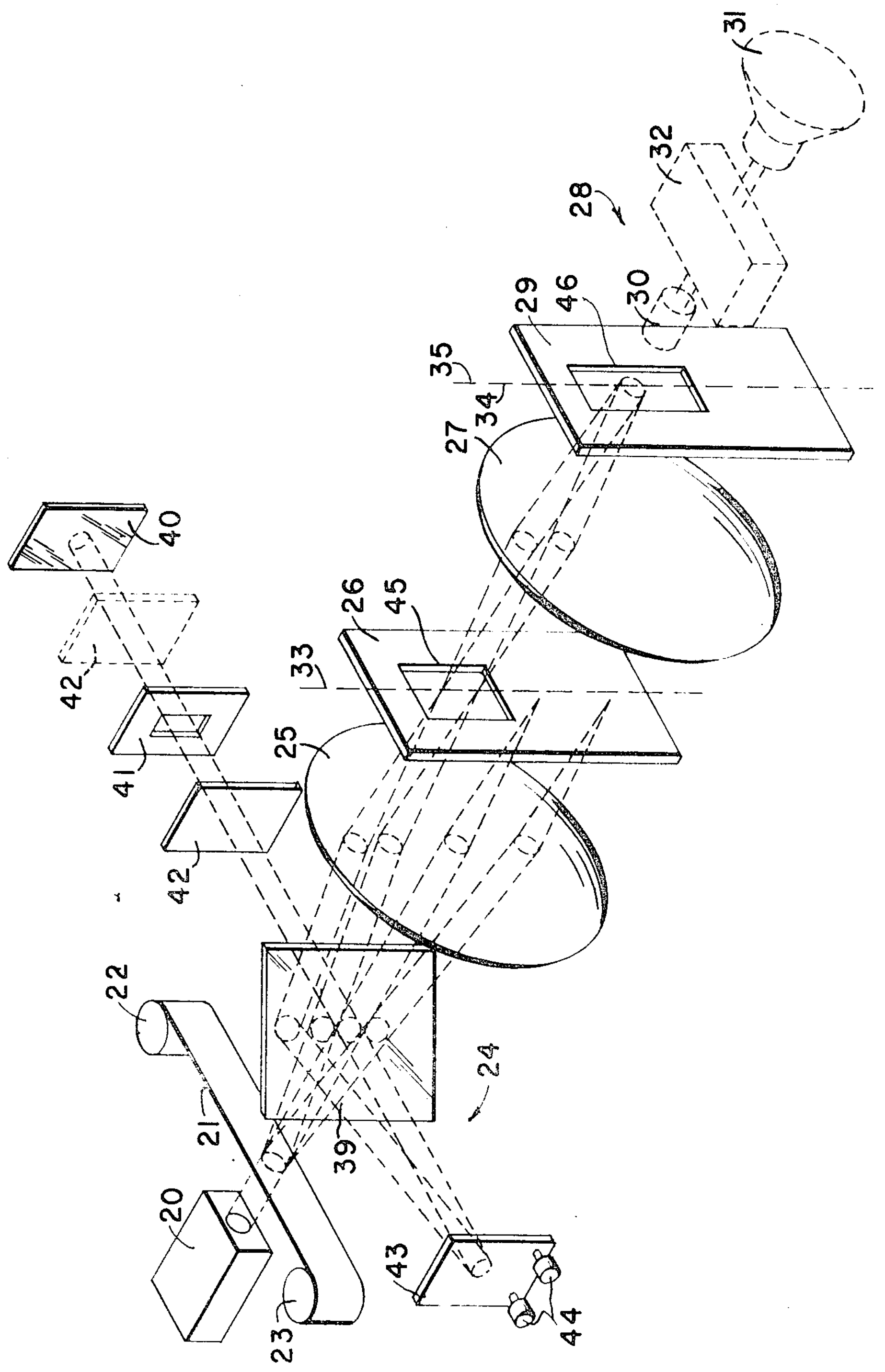
FIG. 3 is a perspective view showing the preferred embodiment of the invention.

Referring to FIG. 3, the present invention apparatus consists of a source of parallel monochromatic light 20, which in this instance is a laser; a light-responsive storage information medium 21, which may be any type of conventional film and which is fed past the light source 20 by means of conventional takeup 22 and supply means 23; a beam-splitting apparatus, generally indicated by the numeral 24; a first lens 25; a spatial filter 26; a second lens 27; an output means, generally indicated by the numeral 28, which includes another spatial filter 29. The output of this device can be obtained by utilizing a photomultiplier tube 30 and conventional electronic audio means indicated by the speaker 31 and audio amplifier means 32. The output of this system is not restricted to audio alone, but may be placed on film, on a direct-visual screen, or on an oscilloscopic display of the stored information. The technique of the present invention could also be accomplished with an apparatus having one lens in lieu of the two lenses just described.

THEORY

If plane-parallel, monochromatic light, which is that provided by a laser operating in its fundamental mode, impinges on a portion of film that contains spectral information recorded in a raster pattern, a two-dimensional Franunhofer diffraction pattern, consisting of a set of orders, will be produced from the resultant optical waves. The diffraction spots, which occur as a result of the Franunhofer diffraction pattern, below and above the $\omega_x$ axis, as shown in FIG. 20, are progressively referred to as first, second and third order diffraction spots. The position of these spots in the Fourier transform plane 33 is a very accurate function of the recorded frequency. Describing this situation mathematically, we will consider the pattern which has been recorded, either by electron or laser beam technique, on photographic film, in the manner shown in FIG. 2A. If a single frequency signal has been recorded on film, it will appear in the first Fourier transform plane 33 as shown in FIG. 2D. This signal can be described by the equation:

(1)

$$A_s(\omega_x\omega_y)=Ae^{i\frac{2\pi}{\Delta y}(n-\tau/T_1)\alpha t}\cdot\delta\{\omega_x-\omega_1\}\cdot\delta\left\{\omega_y+\frac{2\pi}{\Delta y}(n-\tau/T_1)\right\}$$

where $A_s(\omega_x\omega_y)$ represents the signal spot in the first Fourier transform plane, $A$ represents the amplitude of the signal, $\tau$ represents the length of the recorded track, $\alpha$ represents the speed of the film, $\Delta y$ represents the track-to-track separation, and $T_1$ represents the spatial period of the recorded signal. In a magnetic tape recorder, a single recorded sine wave can be recovered by merely passing the tape across a magnetic head. In the optical receiver technique this is impossible because if the defraction spot described by equation No. 1 is passed through a small aperture to the second Fourier transform plane 34, which is also the image plane 35, then a detector sees a constant DC signal. This is true whether the film is moving or not. All of the information is contained in the propagating optical electromagnetic wave, but it is present in the phase and not the amplitude of the signal. Since a photomultiplier cannot detect phase, it cannot extract any information from the signal. In order to extract the phase information, it is necessary to provide a reference wave. This can be accomplished by the apparatus of the present invention shown in FIG. 3.

A beam-splitting means 24, which will be described in more detail herein below, includes a beam-splitting mirror 39 which divides the image and passes one portion down the optical axis of the system and deflects the other portion towards a reflecting mirror 40. A mask 41 is applied to this mirror such that it reflects only the zero-order diffraction spot (center portion of the beam). The beam is then reflected from a second reflecting means 43 back towards the beam-splitting mirror 39 and then towards the first transform plane 33. The second reflecting means 43 is pivoted such that the zero-order beam may be positioned at any arbitrary location in the first Fourier transform plane 33.

If the reference spot is positioned such that it lies in a direct vertical line with the recorded-signal spot, then it may be represented by the equation:

(2) $$A_r(\omega_x\omega_y) = B\delta(\omega_x-\omega_1)\,\delta\{\omega_y-F(y)\}$$

This equation is independent of time and holds for any arbitrary position in the $\omega_y$ direction.

The diffraction spots described by equations Nos. 1 and 2 are allowed to pass to the image plane 35 and the signal present at the image planes, $a(xy)$, can be represented by the equation:

(3) $$a(xy) = \int_{-\infty}^{+\infty}\int_{-\infty}^{+\infty}(A_s+A_r)e^{i(\omega_x x+\omega_y y)}d\omega_x\omega_y$$

Substituting equations 1 and 2 into 3 yields:

(4)
$$a(xy) = \left[\int_{-\infty}^{+\infty}\delta(\omega_x-\omega_1)e^{i\omega_x x}d\omega_x\right]\cdot\left[Ae^{i\frac{2\pi}{\Delta y}\left(n-\frac{\tau}{T_1}\alpha t\right)}\right]\cdot$$
$$\int_{-\infty}^{+\infty}\delta\left\{\omega_y+\frac{2\pi}{\Delta y}\left(n-\frac{\tau}{T_1}\right)e^{i\omega_y y d\omega}y+\right.$$
$$B\int_{-\infty}^{+\infty}\delta\{\omega_y-f(y)\}e^{i\omega_y y}d\omega_y$$

Due to the fact that the reference beam diffraction spot has been inserted in a vertical line with the signal diffraction spot, all interference fringes occur in the $y$ direction and thus allows the use of a slit detector, such that the slit runs along the $x$ axis and is vanishingly small in the $y$ direction.

In this case $y=O$ and equation No. 4 reduces to:

(5) $$a(xy) = e^{-i\omega_1 x}\left[Ae^{i\frac{2\pi}{\Delta y}\left(n-\frac{\tau}{T_1}\right)\alpha t}+B\right]$$

The photomultiplier sees the signal:

(6) $$I = a(xy)\cdot a^*(xy)$$

Then equation No. 5 reduces to:

(7) $$I = A^2+B^2+2ABe^{i\frac{2\pi}{\Delta y}\left(n-\frac{\tau}{T_1}\right)\alpha t}$$

Equation No. 7 shows that the photomultiplier tube detects DC and AC components. If $2\pi\alpha/\Delta y$ corresponds, for example, to the audio frequency 15 kilocycles, the AC component is recovered at a fraction $[n-(\tau/T_1)]$ of the 15 kilocycle audio frequency. Thus, the use of a reference beam makes it possible to detect the presence of a single sine wave.

Considering the case where two sine waves have been recorded, if a second sine wave has a period $T_2$, then equation No. 4 can easily be modified to include the effect of the second signal. For this case:

(8) $$a(xy) = e^{-i\omega_1 x}\left[Ae^{i\frac{2\pi}{\Delta y}\left(n-\frac{\tau}{T_1}\right)\alpha t}+B+Ce^{i\frac{2\pi}{\Delta y}\left(n-\frac{\tau}{T_2}\right)\alpha t}\right]$$

Letting $$\frac{2\pi\alpha}{\Delta y}\left(n-\frac{\tau}{T_1}\right)=\omega_a$$

and $$\frac{2\pi\alpha}{\Delta y}\left(n-\frac{\tau}{T_2}\right)=\omega_b$$

The Equation No. 8 reduces to:

(9) $$a(xy) = e^{-i}[Ae^{i\omega_a t}+B+Ce^{i\omega_b t}]$$

Thus:

(10) $$I = a(xy)\cdot a^*(xy) = A^2+B^2+C^2+2AB\cos\omega_a t + 2BC\cos\omega_b t + AC\cos(\omega_b-\omega_a)t$$

Equation No. 10 shows that not only are the frequencies $\omega_a$ and $\omega_b$ recovered, but the distortion product $[\omega_b-\Omega_a]$ is so that $B$ is much greater than $A$, and also so that $B$ is much greater then $C$, then the distortion term is negligible compared to the desired signals. It should be noted that this technique derives the proper signals directly from the photomultiplier output. In previous techniques it was necessary to take the square root of the photomultiplier output, which is not necessary in this technique.

Figure 2B:
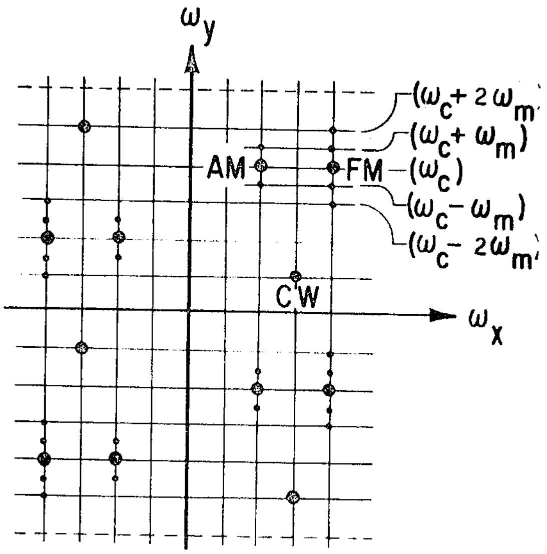
FIGS. 2B, 2C and 2D are graphic illustrations of actual displays of an information signal recorded in the manner illustrated in FIG. 2A.

Thus, by using a reference beam it is possible to recover signals of any modulation type, and continuous wave signals as well, such as those illustrated in the graphical spectral display shown in FIG. 2B. FIG. 2B shows the spectral display of these signals in the first Fourier transform plane of the optical receiver. Although the recovery produces some distortion products, proper adjustment of system parameters reduces this distortion to negligible values.

BEAM-SPLITTING OPERATION

Figure 4:
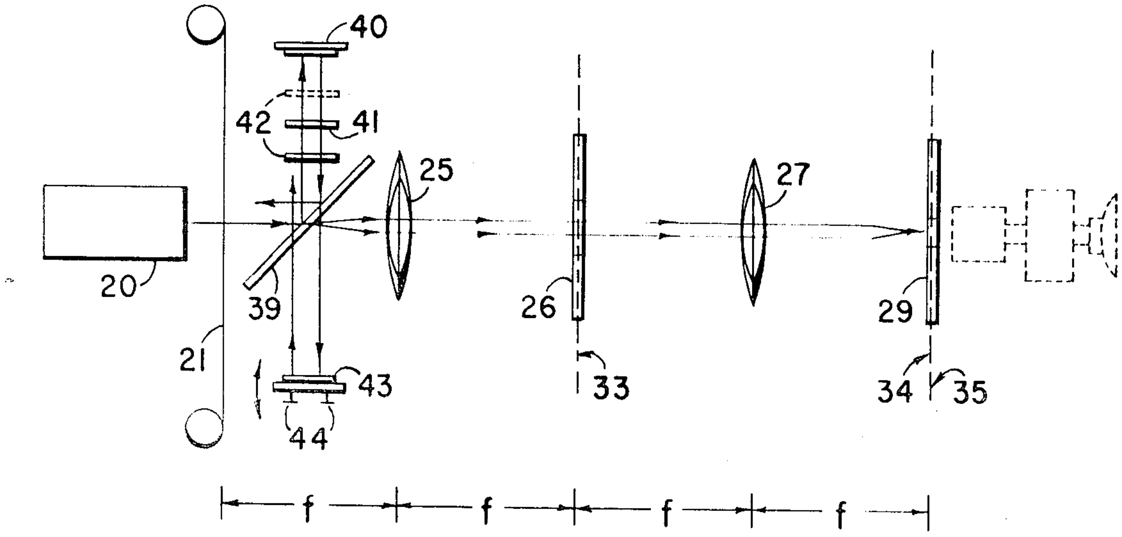
FIG. 4 is a top view of the preferred embodiment of the invention shown in FIG. 3.

The beam-splitting means 24 used to derive a zero-order-reference beam consists of the half-silvered, beam-splitting mirror 39; the first reflecting mirror 40, preceded by the spatial filter 41 and a neutral density filter 42; and the second adjustable reflecting mirror 43, which may be adjustable by means of screws 44. The function of the neutral density filter 42, a device which is old in the art, is to vary the amplitude of the reference beam directed through it to a suitable mixing level. In this instance, the zero-order beam for all intents and purposes is located in front of the spatial filter 41. Its location there or in back of the spatial filter 41 is immaterial as long as the wave containing the zero-order beam passes through this neutral density filter 42. If one desired to utilize the derived zero-order beam directly without varying its intensity, one may simply just remove the neutral density filter 42. Referring now to FIG. 4, which pictorally illustrates how the zero-order-reference beam is derived. The source of plane parallel monochromatic light 20 illuminates the storage medium 21 yielding optical waves of several orders, which pass on to the beam-splitting mirror 30 located at an angle of 45° to the normal. This half-silvered beam-splitting mirror 39 splits the incident wave into a first and a second wave. It is the second wave from which we derive the zero-order-reference wave. The second wave is directed towards a reflecting mirror 40, through the neutral density filter 42 and a spatial filter 41. The spatial filter 41 has an aperture just large enough to pass the zero-order beam. The second beam is reflected off the mirror 40 back towards the beam-splitting mirror 30. The beam reflected from the mirror 10, now contains only the zero-order of the multiple order optical wave, such as that illustrated in FIG. 2C. This reflected zero-order beam strikes the beam-splitting mirror 39, and a portion of this reflected zero-order beam is directed back towards the laser 20, which we may neglect, and the other portion is reflected towards a second mirror 43 which is adjustable so as to be able to position the zero-order beam at any arbitrary location in the first Fourier transform plane 33. This other portion of the beam strikes the adjustable mirror 43 and is reflected back again towards the beam-splitting mirror 39. It strikes the beam-splitting mirror 39 and once again this beam is split into two portions, one portion being reflected down the optical axis of the system towards the first lens 25, and the second portion being reflected in direction of the zero-order spatial filter 41, which we may neglect for all intensive purposes. The portion of the zero-order beam, derived in this manner, which is reflected down the optical axis of the system, is what we refer to as our reference beam, and it is this beam which will be optically mixed with the information beam initially directed down the optical axis of the system.

The reflective quality of the beam-splitting mirror 39 utilized in the beam-splitting operation is dependent on the amount of silver coating on the mirror 39 to vary the intensity of the reflected signal. For example, if a beam-splitting mirror having a reflective quality of 50 percent (½) is used, a reference beam of ⅛ the intensity of the original incident zero-order optical wave would be obtained from the beam-splitting operation.

The system shown in FIG. 5 is an alternative apparatus for deriving a reference beam. The reference beam derived utilizing this system is not technically a "zero-order beam" since no orders are derived until the plane parallel monochromatic light passes through the storage medium 21 and produces optical waves of these orders; however, the reference beam derived and utilized in this system has the same characteristics as a zero-order beam. In this system, the beam-splitting mirror is at a 45° angle to the vertical instead of the horizontal, and a portion of the original incident wave is used as the reference beam which is optically mixed (recombined in space) with the desired optical wave at the image plane, such recombination being shown for illustrative purposes only, as a point at the image plane 29.

Now, concerning ourselves with the Fourier-transform-detection apparatus, the beams directed down the optical axis of the system of the present invention then pass through a first lens 25, which is located one focal length from the storage medium 21, at the first Fourier transform plane 33, thereby resulting in a zero-order-reference beam, and an optical wave which can be described mathematically by equation No. 1. These beams are further directed down the optical axis by the first lens 25 to a second spatial filter 26, located one focal length from the first lens 25, whose purpose is to isolate the desired signal. This second spatial filter 26 accomplishes this by having an aperture 45 only large enough to allow passage of this selected signal and the reference beam being directed to this aperture 45. The reference beam is directed to this aperture 45 in the second spatial filter 26 by pivoting the adjustable mirror 43 so as to direct this beam through the beam-splitting mirror 39 and the first lens 25 to this aperture. The zero-order-reference beam and the selected beam, containing the information desired to be detected, further passes down the optical axis to a second lens 27, located at one focal length from the second spatial filter 26. At the second lens 27, a second Fourier transform of the selected optical information beam occurs. This lens 27 further directs the zero-order-reference beam so as to optically mix with the selected information beam which has passed through the lens 27 to the image plane 35 where the output is derived. This optically mixed signal yields the desired information content of the information which had been stored on the light-responsive storage medium 21. To minimize distortion of this information output, a third spatial filter 29, containing a long, very narrow slit aperture 46, is placed at the image plane 35, one focal length away from the second lens 27.

One may utilize zone plates in place of the lenses 25 and 27 in another embodiment of the Fourier transform apparatus.

OUTPUT

If an audio output is desired from this system, a photomultiplier tube 30 can be located at the image plane 35 behind the slit 46 in the third spatial filter 29. This photomultiplier tube 30 may be electrically connected to an audio output device 32 through a speaker 31 if an audio output is desired. As was previously mentioned, other types of outputs may also be derived from this system utilizing conventional electronic output devices such as a discriminator to derive an audio output of an FM signal, or an oscilloscope to obtain a visual output of the information signal that is desired.

It is to be understood that the above-described embodiment of the invention is merely illustrative of the principles thereof and that numerous modifications and embodiments of the invention may be derived within the spirit and scope thereof.

What is claimed is:

1. A coherent optical processing system comprising:
 a light-responsive storage medium containing stored signal information;
 means for illuminating said light-responsive storage medium to produce optical waves; and
 signal recovery means, including optical mixing means, wherein said optical mixing means includes beam-splitting means, for producing at least one reference wave to mix with optical waves to produce optically mixed waves, said signal recovery means for recovering from said optical waves said stored signal information content wherein the signal recovery means includes means for causing at least one Fourier transform of said optical waves and said reference waves, for recovering from said optical waves the stored signal information content.

2. A coherent optical processing system in accordance with claim 1 wherein said illumination means is a source of plane parallel, monochromatic light.

3. A coherent optical processing system in accordance with claim 1 wherein said means for causing at least one Fourier transform comprises a first Fourier transform causing means and a second Fourier transform causing means.

4. A coherent optical processing system in accordance with claim 3 wherein said second Fourier transform causing means is a second lens.

5. A coherent optical processing system in accordance with claim 3 wherein said first Fourier transform causing means is a lens.

6. A coherent optical processing system in accordance with claim 5 wherein said second Fourier transform causing means is a second lens.

7. A coherent optical processing system in accordance with claim 1, wherein said signal recovery means includes an output means for obtaining the desired information output of said signal.

8. A coherent optical processing system in accordance with claim 7 wherein said output means includes a first tuning means and a photomultiplier means.

9. A coherent optical processing system in accordance with claim 8 wherein said first tuning means is a first spatial filter.

10. A coherent optical processing system in accordance with claim 8 wherein the first spatial filter contains a very narrow and long aperture for minimizing distortion.

11. A coherent optical processing system in accordance with claim 1 wherein said signal recovery means includes a second tuning means.

12. A coherent optical processing system in accordance with claim 11 wherein said second tuning means is a second spatial filter.

13. A coherent optical processing system in accordance with claim 12 wherein the second spatial filter contains an aperture which is only large enough to pass the optical wave containing the desired information and a reference wave.

14. A coherent optical processing system in accordance with claim 11 wherein said beam-splitting means includes:
 means for splitting the optical wave into a first beam and a second beam; optical wave reflecting means for reflecting said second beam; and
 third tuning means for tuning said second beam to produce the reference wave.

5. A coherent optical processing system in accordance with claim 14 wherein said optical wave reflecting means comprises a first reflecting means and a second reflecting means.

16. A coherent optical processing system in accordance with claim 15 wherein said first and second reflecting means are mirrors.

17. A coherent optical processing system in accordance with claim 17 wherein said second reflecting mirror means is adjustable so as to be able to direct the location of the reference wave so as to enable it to pass through an aperture in the second spatial filter which is only large enough to pass the optical wave containing the desired information and the reference wave.

18. A coherent optical processing system in accordance with claim 15 wherein said third tuning means is a third spatial filter for allowing passage of only a zero-order-reference beam.

19. A coherent optical processing system in accordance with claim 18 wherein said third spatial filter is located between said first reflecting means and said optical wave-splitting means.

20. A coherent optical processing system in accordance with claim 19 wherein a neutral density filter means for varying the intensity of the zero-order-reference beam is located adjacent to the third spatial filter.

21. A coherent optical processing system in accordance with claim 19 wherein said optical wave-splitting means is a half-silvered mirror.

22. A coherent optical processing system in accordance with claim 21 wherein the first lens is one focal length away from the light-responsive storage medium, the second spatial filter is one focal length away from the first lens, the second lens is one focal length away from the second spatial filter, the first spatial filter is one focal length away from the second lens, the optical wave-splitting mirror is at an angle of 45° to the normal to the surface of the light-responsive storage medium, the first reflecting mirror is parallel to the normal to the surface of the light-responsive storage medium and the second reflecting mirror is adjustable from said normal so as to be able to direct the location of the reference wave so as to enable it to pass through a second spatial filter aperture, which is only large enough to pass the optical wave containing the desired information and the reference wave.

23. A coherent optical processing system in accordance with claim 22 wherein a neutral density filter for varying the intensity of the zero-order-reference beam is located adjacent to the third spatial filter.

24. A coherent optical processing system comprising: a light-responsive storage medium containing stored signal information; means for illuminating said light responsive storage medium to produce optical waves; and signal recovery means, including optical mixing means, wherein said optical mixing means includes beam-splitting means for producing at least one reference wave to mix with optical waves to produce optically mixed waves, said signal recovery means for recovering from said optical waves said stored signal information content.

* * * * *

UNITED STATES PATENT OFFICE
CERTIFICATE OF CORRECTION

Patent No. 3,623,024 Dated November 23, 1971

Inventor(s) Dale Leslie Hamilton

Figure 2C:
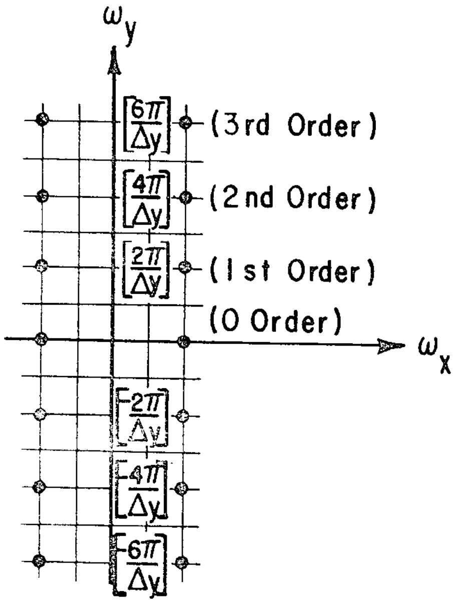
Figure 2D:
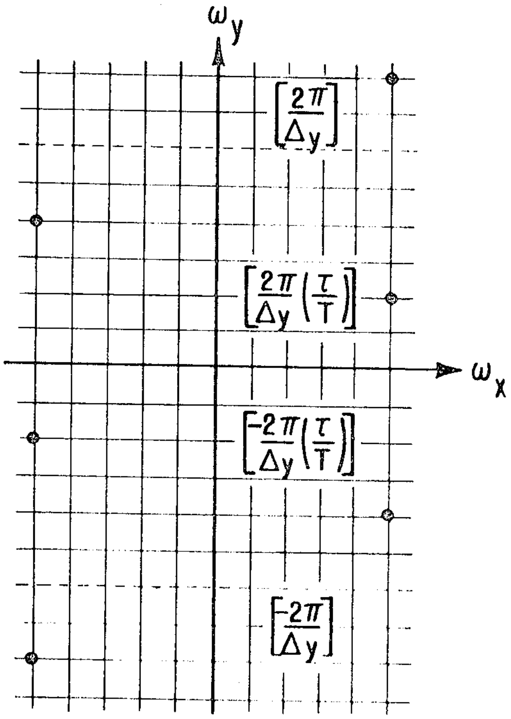

It is certified that error appears in the above-identified patent and that said Letters Patent are hereby corrected as shown below:

Column 1, line 59, the heading "PRIOR ART" should appear before the paragraph beginning at this line;

Column 2, line 47, "FIG. 20" should read --FIG. 2C--;

Column 3, line 43, that portion of the first line of formula (4) reading "$(n - \frac{\tau}{T_1}\alpha t)$" should read --$(n - \frac{\tau}{T})\alpha t$--;

Column 4, line 19, the term "$[\omega_b - \Omega_a]$" should read --$[\omega_b - \omega_a]$--;

Column 4, lines 57 and 65, the numeral "30" should be --39--;

Column 7, the claim designated "5" should be --15--;

Column 7, line 8, the term "claim 17" should be --claim 16--.

Signed and sealed this 16th day of May 1972.

(SEAL)
Attest:

EDWARD M.FLETCHER,JR.
Attesting Officer

ROBERT GOTTSCHALK
Commissioner of Patents